United States Patent [19]

Harner et al.

[11] Patent Number: 4,462,753

[45] Date of Patent: Jul. 31, 1984

[54] BLADE FEATHERING SYSTEM FOR WIND TURBINES

[75] Inventors: Kermit I. Harner, Windsor; John P. Patrick, South Windsor; Kenneth F. Vosseller, Enfield, all of Conn.

[73] Assignee: United Technologies Corporation, Hartford, Conn.

[21] Appl. No.: 391,016

[22] Filed: Jun. 22, 1982

[51] Int. Cl.³ ............................................. F03D 7/04
[52] U.S. Cl. ........................................ 416/48; 416/49
[58] Field of Search ................................. 416/46–50, 416/157 R, 158, 156

[56] References Cited

U.S. PATENT DOCUMENTS

| | | |
|---|---|---|
| 2,338,483 | 1/1944 | Beeke, Jr. . |
| 2,423,400 | 7/1947 | Nichols . |
| 2,437,701 | 3/1948 | McCoy . |
| 2,640,555 | 6/1953 | Cushman . |
| 2,657,755 | 11/1953 | Cushman . |
| 2,661,806 | 12/1953 | Nims et al. . |
| 2,705,537 | 4/1955 | Nichols . |
| 2,850,105 | 9/1958 | Brandes . |
| 2,865,460 | 12/1958 | John, Jr. . |
| 2,887,164 | 5/1959 | Hendrix et al. . |
| 3,068,943 | 12/1962 | Fischer . |
| 3,070,174 | 12/1962 | Toulmin, Jr. . |
| 3,112,901 | 12/1963 | Kohman ............................ 416/48 X |
| 3,115,938 | 12/1963 | Fischer et al. . |
| 3,269,121 | 8/1966 | Bening .............................. 416/47 X |
| 4,160,170 | 7/1979 | Harner et al. ................. 416/41 A X |
| 4,260,329 | 4/1981 | Bjorknas ........................... 416/49 X |
| 4,348,155 | 9/1982 | Barnes et al. ................... 416/158 X |
| 4,348,156 | 9/1982 | Andrews ......................... 416/158 X |
| 4,352,634 | 10/1982 | Andrews ......................... 416/157 X |

*Primary Examiner*—Everette A. Powell, Jr.
*Attorney, Agent, or Firm*—John Swiatocha

[57] ABSTRACT

A blade feathering system for wind turbines includes a feather actuator (299), control means (330 and 335) operatively connected thereto and an adjustment means (340) operatively connected to the control means for selectively varying the rate of operation of the feather actuator for feathering the wind turbine blades (10 and 15) at a variable rate.

4 Claims, 1 Drawing Figure

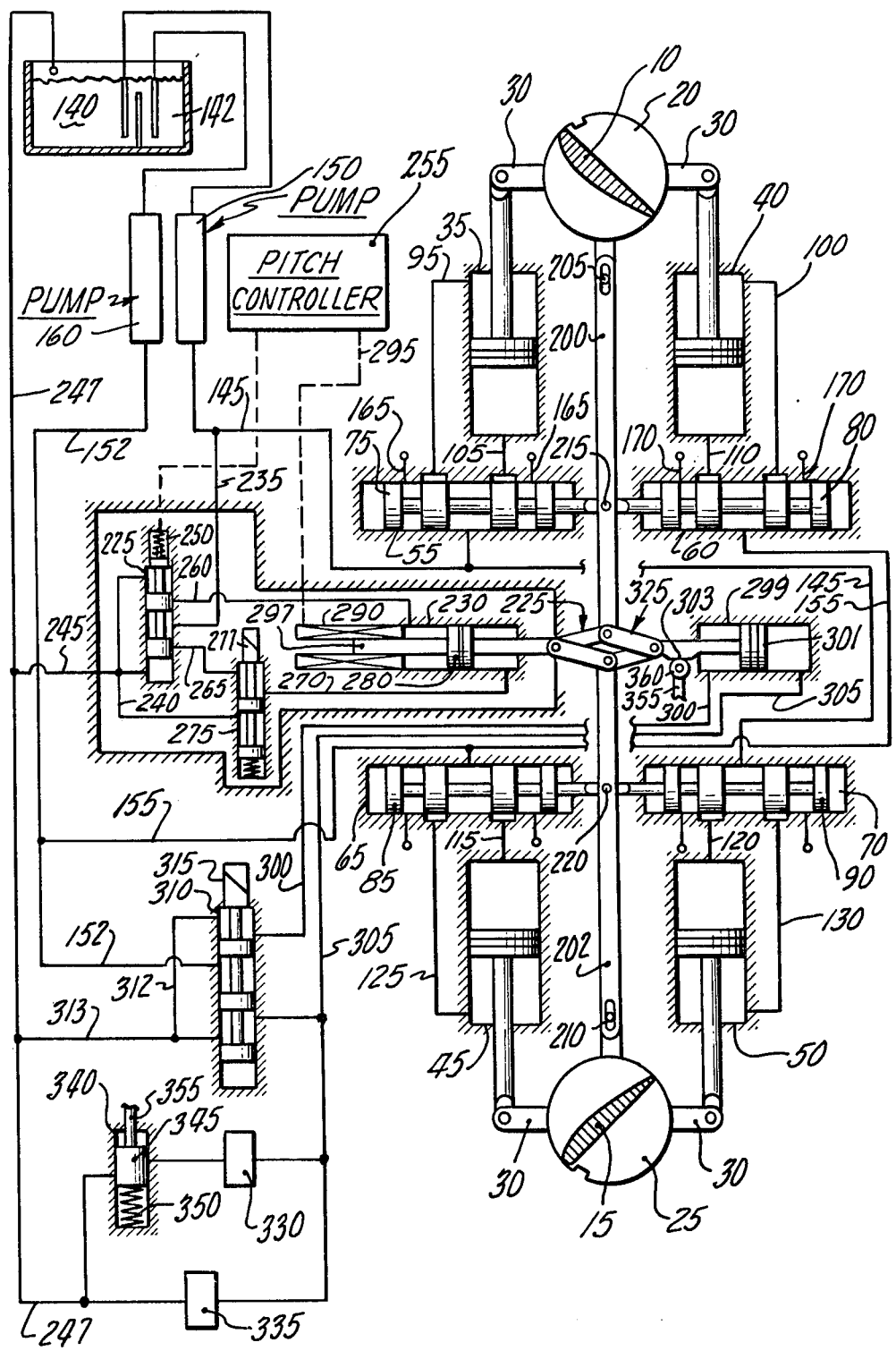

BLADE FEATHERING SYSTEM FOR WIND TURBINES

DESCRIPTION

1. Technical Field

This invention relates generally to wind turbines and more specifically to a system for feathering the blades of a wind turbine at a varying rate.

2. Background Art

It is the practice to provide large wind turbines which drive synchronous generators to produce electrical power with systems for feathering the turbine's blades when it is desired to shut the turbine down. A well-known condition requiring such blade feathering is excessive wind velocity. While the turbine's blade pitch control system may be capable of feathering the blades under such conditions, feather systems are provided for emergency blade feathering upon failure of the blade pitch control system. To achieve such feathering, the pitch angle of the blades is adjusted to approximately 90° whereupon wind flow over the blades fails to produce any torque which would otherwise cause rotation of the blades and therefore, rotation of the generator rotor.

To minimize operating time at overspeed conditions, rapid blade feathering is desirable. However, feathering at a constant, rapid rate could result in excessive blade stresses due to substantial decelerating (negative) torque and reverse thrust developed by the blades as they approach fullyfeathered positions. Accordingly, as the blades are feathered, once blade pitch has increased to the point where airflow over the blades no longer develops positive torque on the turbine rotor, it would be desirable to reduce the rate of feathering to minimize the decelerating torque and reverse thrust developed by the blades, thereby minimizing blade stresses. However, for reasons of safety, such a reduction in pitch rate as the blades approach their feathered positions, should not come at the expense of feathering at a maximum rate while airflow over the blades develops a positive shaft torque.

DISCLOSURE OF INVENTION

It is therefore, a principal object of the present invention to provide a wind turbine blade feathering system wherein feathering of the blades occurs at a variable rate to minimize blade stresses otherwise resulting from rapid deceleration of the turbine rotor.

It is another object of the present invention to provide such a wind turbine blade feathering system of enhanced reliability.

It is another object of the present invention to provide such a wind turbine blade feathering system which operates independently of electrical power.

These and other objects of the present invention are attained by the wind turbine blade feathering system of the present invention wherein blade feathering is controlled by a feather actuator having means connected thereto, for controlling the rate of operation of the feather actuator and means connected to the control means to effect adjustment thereof under feather conditions to diminish the actuator rate of operation as the blades are feathered. Adjusting the control means to diminish the operation rate of the actuator with time from the initiation of blade feathering, allows the feather actuator to cause feathering at an initial, relatively higher rate for rapid feathering during the period of time where airflow over the rotor develops a positive aerodynamic torque thereon. Subsequently, as feathering continues and the blades approach a blade angle where positive aerodynamic torque is no longer developed by the rotor, the adjustment means adjusts the control means to reduce the operation rate of the feather actuator such that the actuator feathers the blades at a diminished rate, thereby limiting blade stresses due otherwise to large blade deceleration torques and reverse thrust.

In the preferred embodiment, the feather actuator is an hyudraulic actuator and the control means comprise parallel flow controllers in a line through which hydraulic fluid is drained from the actuator. The adjustment means comprises a valve which either allows flow through the flow controller pair or blocks flow through one of the flow controllers, thereby varying the resistance to the draining of the actuator to vary the actuator's rate of operation. The valve may be operated by the feather actuator itself, the position of the actuator at which the valve is operated corresponding to that point in the feathering of the blades wherein positive aerodynamic torque is no longer developed by the turbine rotor.

BRIEF DESCRIPTION OF THE DRAWINGS

The sole FIGURE is a schematic representation of a preferred embodiment of the wind turbine blade feathering system of the present invention.

BEST MODE FOR CARRYING OUT THE INVENTION

Referring to the FIGURE, a schematic diagram of wind turbine blade pitch change and feather actuation systems is shown. These systems are illustrated in use with a wind turbine having two blades 10 and 15. It will be understood however, that the wind turbine blade feathering system of the present invention, shown herein with the pitch control system may be readily adapted to wind turbines having any required number of blades.

Blades 10 and 15 are mounted on platforms 20 and 25 each such platform having arms 30 extending generally radially outwardly therefrom. Arms 30 of platform 20 are pivotally connected to actuators 35 and 40 while the arms of platform 25 are pivotally connected to actuators 45 and 50.

Actuators 35, 40, 45 anmd 50 drive blades 10 and 15 in blade pitch adjusting and feathering modes of operation, actuators 35 and 40 driving blade 10 whileactuators 45 and 50 drive blade 15. The actuators are controlled by actuator control valves 55 (controlling actuator 35), 60 (controlling actuator 40), 65 (controlling actuator 45) and 70 (controlling actuator 50). Actuator control valves 55 and 60 include inner, connected spools 75 and 80, respectively, and valves 65 and 70 include inner, connected spools 85 and 90, it being readily apparent that the four actuator control valves may be substantially identical.

The positioning of the control valve spools determines which ends of the blade actuators are connected to pressurized hydraulic fluid and which are connected to drain. Actuators 35 and 40 are pressurized and drained through upper lines 95 and 100 and lower lines 105 and 110. Likewise, actuators 45 and 50 are pressurized and drained through upper lines 115 and 120 and lower lines 125 and 130.

Pressurized hydraulic fluid is supplied to control valves 55, 60, 65 and 70 from independent reservoirs 140 and 142. Fluid is drawn from reservoir 140 through line 145 by pump 150 for pressurization of valves 55 and 70 and from reservoir 142, through lines 152 and 155 by pump 160 for pressurization of valves 60 and 65. It is seen that reservoir 140, pump 150 and the connected lines comprise an hydraulic system independent from reservoir 142, pump 160 and the lines connected thereto. Such redundancy allows pitch adjustment of both blades to take place despite any failure of one of these systems.

The positioning of the spools of the blade actuator control valves determines the pressurization and drain of the blade actuators. Referring for ewxample to blade 10, blade actuators 35 and 40, and actuator control valves 55 and 60, it will be seen that movement of connected spools 75 and 80 to the right, causes the lower portion of actuator 35 to be pressurized through line 145, valve 55 and line 105 while the upper portion of the actuator is drained through line 95, valve 55 and left hand drain line 165. Such pressurization and drain of actuator 35 causes the piston and rod thereof to move upwardly. In a similar manner, movement to the right of spool 80 of actuator control valve 60 causes the upper portion of actuator 40 to be pressurized through lines 152 and 155, control valve 60, and line 100 while the lower portion of this actuator is drained through line 110, valve 60 and right hand drain line 170 thereby causing the piston and rod of blade actuator 40 to move downwardly. Such movement of actuators 35 and 40 cause a clockwise movement of platform 20 and therefore, blade 10. Likewise, it will be seen that movement of spools 75 and 80 of control valves 55 and 60 in the opposite direction (to the left) causes an opposite pressurization and drain of blade actuators 35 and 40 thereby causing counterclockwise movement of platform 20 and blade 10. Having thus described the operation of control valves 55 and 60 to selectively pressurize and drain blade actuators 35 and 40 it will be readily apparent that control valves 65 and 70 function in precisely the same manner to selectively pressurize and drain blade actuators 45 and 50 to vary the pitch of blade 15. Thus, movement of spools 85 and 90 of control valves 65 and 70 to the left, cause the lower portion of actuator 45 to be pressurized and the upper portion thereof drained while the upper portion of actuator 50 is pressurized and the lower portion thereof drained to cause a counterclockwise movement of blade 15. Similarly, movement to the right of spools 85 and 90 from their nulled position causes an opposite pressurization and drain of actuators 45 and 50 to achieve a clockwise pitch adjustment of blade 15.

Mechanical input and feedback signals to control valves 55 and 60 are provided by elongate link 200 pivotally connected to platform 20 of blade 10 at 205. Mechanical input and feedback signals to control valves 65 and 70 are provided by elongate link 205 pivotally connected to platform 25 of blade 15 at 210. Link 200 is also pivotally connected to spools 75 and 80 of control valves 55 and 60 at 215. Link 202 is pivotally connected to spools 85 and 90 of control valves 65 and 70 at 220. In operation, movement of the actuator control valve spools to selectively pressurize and drain the blade actuators, causes links 200 and 202 to pivot about their points of connection with the blade platforms. The adjustment in blade pitch resulting from the adjustment of the actuator control valves and energization of the actuators causes the outer ends of links 200 and 202 to pivotally move about the inner ends thereof, thereby moving the control valve spools to their centered or nulled positions whereby further pitch adjustment of the blades is prevented.

Actuation of control valves 55, 60, 65 and 70 is controlled by main control valve 225 and main pitch actuator 230. Main control valve 225 is pressurized through supply line 235 which communicates with supply line 145 downstream of pump 150 and is drained on opposite ends thereof through connected drain lines 240 and 245, drain line 245 connecting to main drain line 247. Control valve 225 is provided with any suitable actuator such as an electromagnetic actuator 250 receiving an input signal thereto from main pitch controller 255. Pitch controller 255 provides an input to actuator 250 based on a desired blade pitch which controller 255 determines based on such inputs as wind conditions, electrical power demands, turbine shaft torque and the like. A suitable pitch controller is disclosed and claimed in U.S. Pat. No. 4,160,170 to Harner et al and entitled "Wind Turbine Generator Pitch Control System."

Main control valve 225 selectively pressurizes and drains main pitch actuator 230 through lines 260, 265, and 270, lines 265 and 270 communicating through first feather valve 275 (operated by actuator 277) the operation of which being described in detail hereinafter. Main pitch actuator 230 includes therein a piston 280 pivotally connected to a scissors type linkage 285 which is pivotally connected to the inner ends of links 200 and 202.

Main control valve 225 is shown in its neutral or nulled position. Energization of the control valve's actuator 250 by pitch controller 255 either raises or lowers the spool of that valve to selectively pressurize and drain main actuator 230 which in turn sets blade actuator control valves 55, 60, 65, and 70 to selectively pressurize actuators 35, 40, 45 and 50 thereby setting blade pitch to a desired value. Assuming for purposes of illustration that the signal from pitch controller 255 to actuator 250 raises the spool of that valve, the left end of main actuator 230 will be pressurized with hydraulic fluid through lines 145 and 235, valve 225 and line 260 while the right side of main actuator 230 is drained through line 270, feather valve 275 and line 265, valve 25 and lines 245 and 247. Such pressurization of main actuator 230 causes movement of piston 280 to the right pivoting link 200 in a counterclockwise direction about connection 205 and pivoting link 202 in a clockwise direction about connection 210. Such movement of links 200 and 202 moves the spools of control valves 55, 60, 65 and 70 to the right, pressurizing actuators 35, 40, 45 and 50 to move blade 10 in a clockwise direction and blade 15 in a counterclockwise direction thereby increasing the pitch of both blades. Movement of the spool of main control valve 225 downwardly causes the pressurization of the right side of main actuator 230 through lines 145, 235, control valve 225, line 265, valve 275 and line 270 while draining the left side of actuator 230 through line 260, control valve 225 and lines 240, 245 and 247. This causes movement to the left of main actuator piston 280 thereby pivoting link 200 in a clockwise direction about connection 205 and link 202 in a counterclockwise direction about connection 210. Such line movement results in movement of all the blade actuator control valve spools to the left to pressurize the blade actuators in a manner to decrease the pitch of the blades, blade 10 moving in a counterclockwise direction and blade 15 moving in a clockwise direction.

Main actuator 230 may include a feedback means 290 which provides a feedback signal to pitch control 255 indicative of the position of the main actuator through line 295. As shown in the FIGURE, feedback means 290 may comprise a transformer having a movable core 297 connected to piston 280. It will be noted by those skilled in the art that the position of the core will correspond to a particular pitch setting of the blades and will determine the output of the transformer.

The blade pitch actuation system described hereinabove not only sets blade pitch under conditions of normal operation, but is also capable of feathering the blades when required, by setting the blades to a maximum pitch setting to prevent airflow over the blades from producing lift thereon. In the event of a malfunction in the pitch actuation system, the blades may be feathered by an emergency feathering system which also sets the blades at maximum pitch to prevent the wind from producing any lift on blades. The emergency feathering system comprises feather actuator 299 selectively pressurized through line 300 and drained through line 305. Actuator 299 includes a piston 301 mounted on rod 302 having a cam 303 portion formed therein. Line 300 communicates with second feather valve 310 connected to pressurized hydraulic fluid through line 152 and drain through lines 312, 313 and 247. Feather valve 310 is operated synchronously with feather valve 275 by a suitable actuator 315. Actuator 315, with actuator 277 of feather valve 275 receives a signal from a suitable controller such as pitch controller 255 (or the removal of such a signal) when feathering of the blades is required. Such signal (or the removal thereof) causes actuators 315 and 277 to liftthe spools of the feather valves thereby causing the right side of main actuator 230 to drain through lines 270, valve 275 and lines 240, 245 and 247 so that such feathering is not impeded by fluid pressure on that right side. Furthermore, lifting of the spool of second feather valve 310 connects the left side of the feather actuator 299 with pressurized hydraulic fluid through line 300, feather valve 310 and line 152. While as shown, feather actuator 299 is pressurized with fluid from pump 160, it will be understood that for added safety, actuator 299 may be supplied with hydraulic fluid from a third independent (redundant) source (not shown) thereof, such third source comprising for example, an accumulator charged by one of pumps 150 or 160. Accordingly, it is seen that lifting of the feather valve spools in response to a feather signal pressurizes the left side of feather actuator 299 thereby moving the actuator piston to the right. Such movement is transmitted to links 200 and 202 through a second scissors linkage 325 moving the spools of blade actuator control valves 55, 60, 65 and 70 to the right, thereby causing blade 10 to pivot in a clockwise direction and blade 15 to pivot in a counterclockwise direction to increaseblade pitch to the upper limnit thereof.

As set forth hereinabove, to limit blade stress due to negative torque and reverse thrust as the wind turbine rotor slows down, it is desired to provide blade feathering at a diminishing rate. In the blade pitch control system of the present invention, such a diminishing feather rate is achieved by draining of the right side of feather actuator 299 at a decreasing rate.

Referring to the drawing, the right side of feather actuator 299 communicates, through line 305 with means 330 and 335 which control the rate of operation of the feather actuator and means 340 which adjusts the control means to effect a diminishing rate of actuator operation as the blades are feathered. In the preferred embodiment, control means 330 and 335 comprise flow controllers connected in parallel, each of which maintains a relatively constant flow output therefrom despite variations in flow input thereto due to for example, failure of the pitch actuation system. Such controllers generally include a throttle valve which sets the effective flow area of the controller and a pressure regulating valve which maintains a constant pressure drop across the throttle valve. Typical of such controllers are the Series TPCS, TPCCSL or PCK flow controllers sold by Parker-Hannifin Corporation, Cleveland, Ohio.

Means 340 comprises a pitch rate control valve which selectively blocks fluid flow through controller 330 being serially disposed with respect thereto. Valve 340 comprises a valve element 345 biased upwardly by return spring 350. A stem 355 extends from valve element 345 and includes a follower 360 on the end thereof, follower 360 engaging cam 303 on feather actuator rod 302. Flow controllers 330 and 335 (as well as valve 340 discharge to drain line 247).

In operation, when a feather signal is fed to actuator 315 the spool of valve 310 is raised, connecting the left side of the feather actuator to pressurized hydraulic fluid through line 300, the feather valve 310, and line 152. The feather valve spool blocks the communication of the right side of the actuator with drain line 313. Therefore, the right side of actuator 299 drains through the combination of flow controllers 330 and 335 and pitch rate control valve 340. As feathering is initiated, the feather actuator piston moves to the right and the stem of valve 340 is raised by the return spring so that the actuator drains through both controllers at a maximum rate. This provides operation of feather actuator 299 at a maximum rate causing feathering at a maximum rate for blade angles (less than, for example, 20°) where the blades develop positive torque. As the blade pitch angles increases beyond this angular setting to positions wherein the blades develop negative torque and reverse thrust, the follower engages cam 303 on the output shaft 302 of feather actuator which lowers the stem of valve 340 thereby blocking flow through controller 330. Blocking flow through controller 330 lowers the rate of draining from feather actuator 299 for diminishment of the feathering rate.

It is readily noted by those skilled in the art that while the feather system of the present invention has been illustrated and described with constant volume flow controllers, these controllers could be replaced by, for example, discrete flow restrictors or resistances without departing from the present invention. Such flow restrictors would be appropriate where pressure input variations to the controllers would not be expected. Thus, where the terms "controllers" or "flow controllers" have been used, such terms refer not only to constant volume controllers such as those described, but also to flow resistances which may be placed in selective fluid communication with the actuator to achieve feathering at a higher initial rate and a lower (dimished) subsequent rate. Furthermore, various other relative orientations of the flow controllers may be employed without departing from the present invention so long as such controllers provide initial operation of the feather actuator at a desired rate and subsequent operation at a relatively lower rate. For example, more or fewer (such as a single flow controller biased to give variable flow rates) than two flow controllers may be employed in various orientations with respect to one another. Alternatively where cavitation in the various fluid lines, valves and actuators is not expected, various combinations of flow controllers may be employed in the fluid inlet line to the feather actuator for controlling the rate of operation thereof.

Moreover, while the present invention has been shown as an hydraulic pitch control and blade feathering system, it will be understood that the present invention is not so limited and where desired, may be employed in an electrical system with equal utility. Thus, feather actuator 299 could comprise an electric motor while controllers 330 and 335 could comprise electrical speed controllers and valve 340 could comprise suitable electrical switching means without departing from the present invention.

Having thus described the invention, what is claimed is:

1. In a blade feathering system for a wind turbine comprising at least one variable pitch blade movable to feathered position and an hydraulic feather actuator adapted to control the feathering of said blade, the improvement characterized by:

said feather actuator having a drain line connected thereto for draining hydraulic fluid therefrom;

a pair of flow controllers communicating with said drain line for controlling the rate of draining of said feather actuator and therefore, the rate of operation thereof; and a pitch rate control valve operated by said feather actuator and in fluid communication with one of said flow controllers for selectively blocking flow therethrough in response to operation of said feather actuator for carrying out said blade feathering at a diminished rate.

2. The blade feathering system of claim 1 characterized by said flow controllers being connected in parallel relationship to one another and said pitch rate control valve being serially connected in said one flow controller.

3. The blade feathering system of claims 1 or 2 and characterized by:

said feather actuator including an output member movable in response to pressurized hydraulic fluid admitted to said feather actuator, said pitch rate control valve being operated by said feather actuator output member, said output member initially opening said pitch rate control valve for allowing flow through said one controller, thereby providing a maximum fluid drain flow from said feather actuator at the initiation of said blade feathering and subsequently closing said pitch rate control valve for blocking flow through said one controller, thereby reducing the drain flow from said feather actuator to feather said blade at a diminished rate.

4. The blade feathering system of claim 3 characterized bu said output member being provided with a cam portion and said pitch rate control valve including an input member provided with a cam follower engageable by said cam portion for opening and closing said pitch rate control valve.

* * * * *

UNITED STATES PATENT AND TRADEMARK OFFICE
CERTIFICATE OF CORRECTION

PATENT NO. : 4,462,753
DATED : July 31, 1984
INVENTOR(S) : Harner et al.

It is certified that error appears in the above-identified patent and that said Letters Patent is hereby corrected as shown below:

Col. 1, line 31, "fullyfeathered" should be --fully feathered".
Col. 2, line 12, "hyudraulic" should be --hydraulic--.
Col. 2, line 49, "anmd" should be --and--.
Col. 2, line 51, "whileactuators" should be --while actuators--.
Col. 3, line 15, "ewxample" should be --example--.
Col. 3, line 58, "205" should be --202--.
Col. 4, line 47, "25" should be --225--.
Col. 5, line 35, "liftthe" should be --lift the--.
Col. 5, line 58, "increaseblade" should be --increase blade--.
Col. 5, line 58, "limnit" should be --limit--.
Col. 6, line 36, after "maximum" delete ",".

UNITED STATES PATENT AND TRADEMARK OFFICE
CERTIFICATE OF CORRECTION

PATENT NO. : 4,462,753

DATED : July 31, 1984

INVENTOR(S) : Harner et al.

It is certified that error appears in the above-identified patent and that said Letters Patent is hereby corrected as shown below:

Col. 8, Claim 2, line 8, after "connected" change "in" to --to--.

Col. 8, Claim 4, line 27, "bu" should be --by--.

Signed and Sealed this

Fourth Day of June 1985

[SEAL]

Attest:

DONALD J. QUIGG

Attesting Officer

Acting Commissioner of Patents and Trademarks